Nov. 5, 1957  A. E. HARTMANN  2,812,198
MECHANICAL CONNECTIONS
Filed May 19, 1955
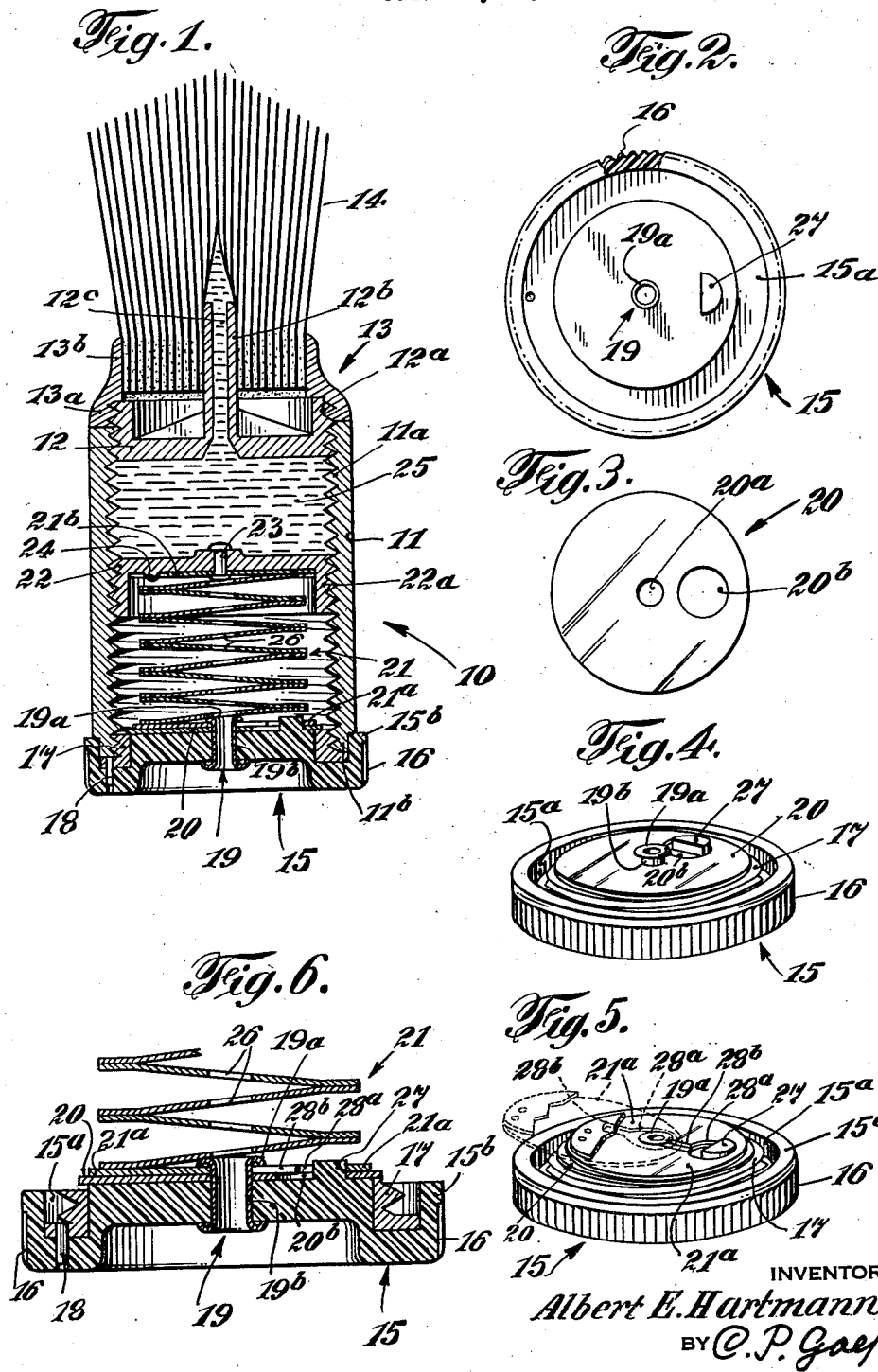
INVENTOR
Albert E. Hartmann
BY C. P. Goepel
his ATTORNEY United States Patent Office 2,812,198
Patented Nov. 5, 1957

2,812,198

MECHANICAL CONNECTIONS

Albert E. Hartmann, New York, N. Y.

Application May 19, 1955, Serial No. 509,531

4 Claims. (Cl. 287—1)

This invention relates to a mechanical connection, and more particularly to a connection for releasably securing in substantially parallel relationship two elements or structures along adjoining surfaces thereof.

The invention will be hereinafter described in connection with a combined shaving brush holder and cream dispenser, it being believed that the novel mechanical connection will find one of its preferred uses therein, but it is to be understood that the invention is in no way limited thereto, as many other uses and applications will occur to men skilled in the art.

The invention consists essentially of the combination of a pair of members each having a substantially flat surface along which surfaces the said members are to be releasably joined by the novel mechanical connection against axial or angular displacement. The first of the members is provided with a projection above said surface thereof that is substantially of a height corresponding to the thickness of the second member and somewhat off the point at which the two members are to be connected. The point of connection of the first member is traversed by a rivet or pin with a reduced neck portion and a larger head portion, both of said portions projecting above its surface of joint and the height of the reduced portion corresponds to the thickness of the second member to be attached to said first member.

The second member is provided with a suitably shaped opening that consists of two communicating bores, the larger of the bores being of a contour to accommodate the projection of said first member and being sufficiently large to receive the head of the rivet or pin, and the second bore extending from the larger bore toward the point of connection of the second member and being of a width sufficient to receive and accommodate the neck portion of the rivet.

When the second member is to be attached to the first member, the larger bore first surrounds the head of the rivet and both members are then moved relative to each other so that the neck portion of the rivet slides in the elongated reduced portion of the bore in the second member. During this movement, the second member is somewhat lifted so that the projection of the first member may enter the larger bore thereof, at which time the head of the rivet is above the points of connection of both members and the structure is locked against axial or angular displacement, whereby the two members may, for example, rotate in unison. To disconnect the two members, the second one is again lifted above the projection and the head of rivet slid in the elongated portion of the opening in a manner reverse to that described above.

In the accompanying drawing,

Fig. 1 is a longitudinal vertical section through a shaving brush provided with a cream dispenser in its handle portion, having a mechanical connection in accordance with this invention applied to its sealing and soap dispensing cap;

Fig. 2 is a plan view of the sealing cap illustrating the rivet head and the projection on its surface along which the connection is made;

Fig. 3 illustrates an intermediate disc or washer;

Fig. 4 is a perspective view showing the sealing cap and the washer joined, and the reduced or neck portion of the rivet below the head;

Fig. 5 shows the first and the final step of joining a flat composite spring with the sealing cap; and Fig. 6 illustrates in section the sealing cap, the washer and the spring upon connection thereof.

Referring now first to Fig. 1, wherein the novel mechanical connection is applied in a shaving brush with built-in cream dispenser, generally indicated by numeral 10, the dispenser consists of a hollow casing 11 provided with internal threads 11a, an intermediate member 12 having an externally threaded cylindrical flange 12a and an axially forwardly projecting extension 12b with a bore 12c therein. The front end of brush holder 10 is provided with a cylindrical member 13 having an internally threaded portion 13a and a cylindrical portion 13b that receives and firmly holds the bristles 14.

The rear (in Fig. 1 the lower) end of the device is provided with a sealing cap 15 that has an annular inner groove 15a (better seen in Figs. 4, 5 and 6) and a flange 15b that fits over the reduced portion 11b of the casing 11. The outer peripheral surface of cap 15 is preferably knurled, as indicated at 16. An externally threaded annular ring 17 fits into the groove 15a and may be connected to cap 15 by a pin 18.

An axially inserted rivet 19 traverses cap 15 and securely holds thereto a washer 20 and the last leaf 21a of a composite spring 21 consisting of a plurality of round discs made of resilient steel or other suitable metal, said discs being diametrically oppositely joined by point welding or soldering at their adjoining surfaces, as shown. The front end leaf 21b of the spring 21 is connected to a cream dispensing member 22 having an annular externally threaded flange 22a whose threads mesh with internal threads 11a on casing 11, said member 22 being axially traversed by a rivet 23, which rivet, together with projection 24 securely holds member 21b of spring 21 to said dispensing member 22 against axial or angular displacement.

A similar brush dispenser has been described by me in U. S. Patent No. 2,568,856, granted on February 7, 1950. The particular construction of spring 21 is of especial advantage in the devices of this character because the spring is adapted to transmit rotational movement from cap 15 to dispensing member 22 while being axially compressible at the same time to allow a capacity loading of shaving cream 25 into casing 11. Each leaf of spring 21 is provided with an axial opening 26 for easy insertion of rivet 23 into member 22.

Fig. 2 illustrates the flat surface of cap 15 with the annular ring 17 removed from its groove 15a, showing a projection 27 and the head 19a of rivet 19. While the projection 27 is illustrated as being of semicircular contour, it may also be triangular, fully round, square or of any other shape.

Fig. 3 illustrates a washer 20 that is provided with holes 20a, 20b, to fit over the rivet 19 and projection 27, respectively. This washer is placed onto cap 15 prior to the provision of rounded head 19a.

Fig. 4 shows the position of washer 20 on cap 15 with annular member 17 below and retained in recess 15a by said washer. It may be seen here that the head 19a of rivet 19 extends above washer 20 to form a neck portion 19b of a height corresponding to the thickness of leaf 21a of spring 21, and that the projection 27 extends sufficiently above washer 20 to extend through leaf 21a, as seen in Figs. 1, 5 and 6.

Fig. 5 shows in dotted lines the initial position of leaf 21a in the course of its connection to cap 15, and its final position in full lines. Leaf 21a is provided with an opening 28 similar to a keyhole, i.e. consisting of an enlarged hole 28a and an elongated aperture 28b terminating at the intended point of connection of leaf 21a to cap 15. The width of aperture 28b corresponds to the diameter of rivet 19 below its head 19a. As shown in dotted lines, hole 28a is first placed over the rivet head 19a, and the leaf 21a then slid in a direction to guide rivet portion 19b into aperture 28b, while leaf 21a of resilient metal is somewhat raised out of its plane to permit projection 27 to enter bore 28a. When the projection is received in the bore 28a, rivet portion 19b has reached the extreme end of aperture 28b and the structure is securely locked against axial and angular displacement, as shown in full lines in Fig. 5. To disconnect members 21a and 15, leaf 21a is again bent upwardly to permit projection 27 to be moved together with cap 15 relative to said bore 28a, and the above-described succession of steps is then repeated in reverse order.

Finally, Fig. 6 illustrates on enlarged scale the lower end of the device 10 shown in Fig. 1, to better show the relative positions of locked elements 15, 17, 20, and 21a, connected by rivet 19 and prevented from relative rotation by projection 27, except for member 17 rotatable with respect to cap 15 in the absence of pin 18.

It will be seen that a novel connection by a rivet having a head to define a neck portion therebelow, and a projection in one member, securely retaining a second member having a suitable hole with a contour to receive both the neck portion of the rivet and the projection, has been provided that insures permanent locking relationship between the two connected members, easy disconnection when desired, and prevents the two members from relative axial or angular displacement.

It will also be understood that simple modifications, such as provision of a square pin or rivet, or connection of a somewhat convex with a somewhat concave surface may be made within the scope of this invention which may be especially advantageously applied in structures wherein a subsequent riveting is impossible or impractical, or where a releasable connection without observable protuberances is to be made.

I claim:

1. In a mechanical connection for releasably connecting a pair of elements against axial and angular displacement, the combination of a first element having a substantially flat surface and a projection extending thereabove, a connecting member anchored in said first element and projecting above said surface thereof with a head at its free end defining a neck portion between said surface and said head, and a second element of flexible material having a bore to receive said projection therein and an elongated aperture communicating with said bore and extending to the point of connection of said second element to said first element, said elongated aperture and said bore forming a keyhole in said second element, said neck portion of said connecting member being received in said elongated aperture and said projection being received in said bore, the thickness of said second element at the point of connection to said first element being less than the length of said neck portion of said connecting member, and the width of said elongated aperture being substantially equal to the transverse dimension of said neck portion of said connecting member when said neck portion is received in said aperture.

2. The combination of claim 1, wherein said neck portion of said connecting member is round and said aperture is of a width substantially equal to the diameter of said neck portion.

3. In a mechanical connection for releasably connecting a pair of elements along substantially flat surfaces thereof, a first element having a substantially flat surface and a projection extending thereabove; a connecting member anchored in said first element and extending above said substantially flat surface thereof, and a second element having a substantially flat surface corresponding in contour to said surface of said first element, said second element being inherently flexible and having a bore substantially corresponding in contour to and adapted to receive said projection, and a reduced elongated aperture in communication with said bore and extending to the point of connection of said second element to said first element, said reduced elongated aperture and said bore forming a keyhole in said second element, said connecting member having a head defining a neck portion between said first element and said head receivable in said aperture in said second element, whereby, when said second element is placed with said bore over said head and slid in a direction to bring said projection into said bore, said neck portion of said connecting member is received in said aperture to join said elements in parallel relationship along said surfaces thereof, said head of said connecting member preventing axial displacement and said projection preventing angular displacement of said second element with respect to said first element.

4. The mechanical connection according to claim 3, wherein an intermediate member is provided between said first and said second element, said intermediate member having a bore for reception of said neck portion of said connecting member and an aperture for reception of said projection.

References Cited in the file of this patent

UNITED STATES PATENTS

| | | |
|---|---|---|
| 2,029,174 | Junge | Jan. 28, 1936 |
| 2,110,137 | Douglas | Mar. 8, 1938 |
| 2,319,782 | Rourke | May 25, 1943 |
| 2,668,724 | Grodson | Feb. 9, 1954 |